Aug. 25, 1931.  R. W. HANNA  1,820,389
PROCESS OF TREATING HYDROCARBON OILS WITH METALLIC HALIDES
Filed Nov. 27, 1926
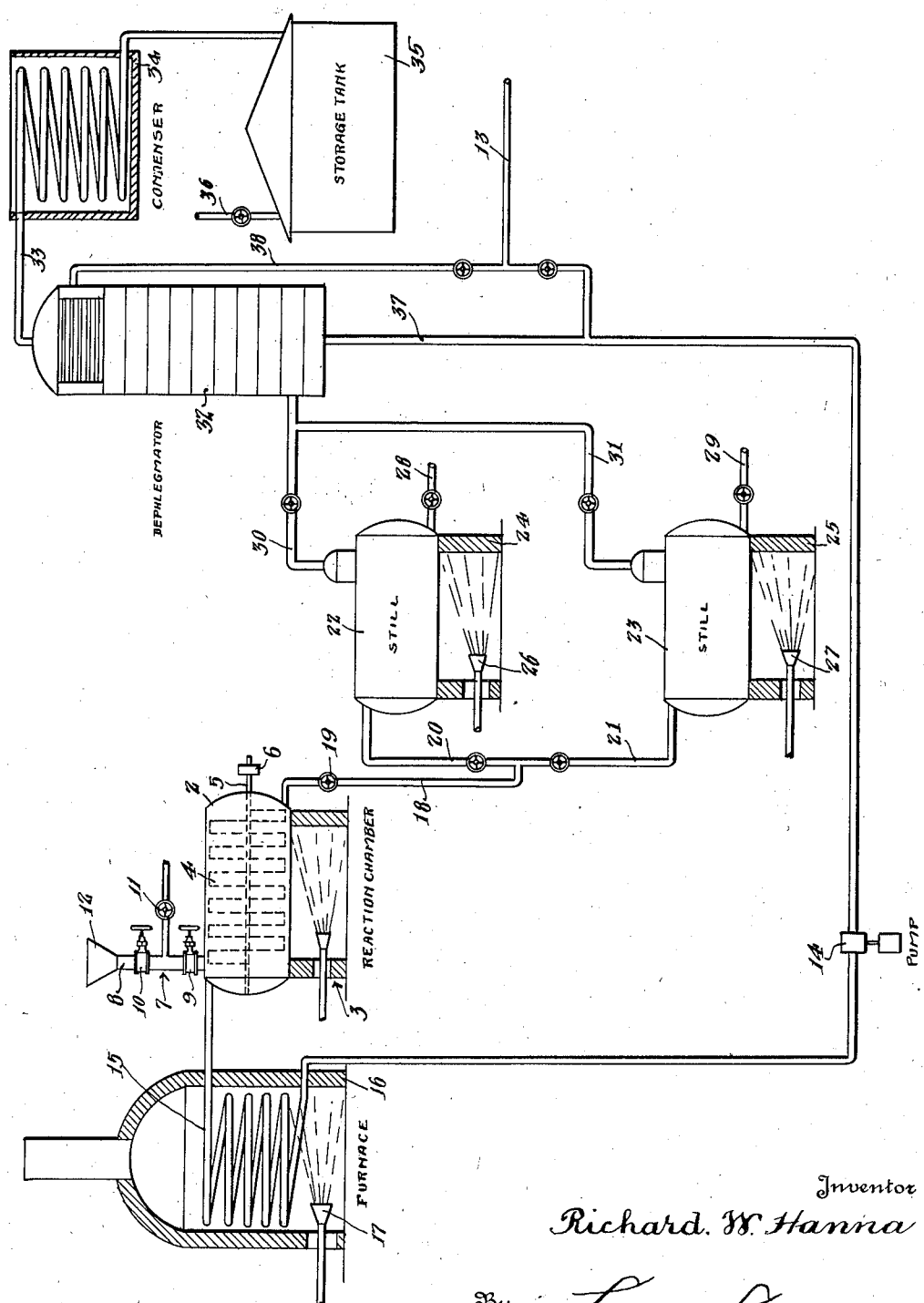
Inventor
Richard. W. Hanna
By Lyon & Lyon
Attorneys Patented Aug. 25, 1931

1,820,389

UNITED STATES PATENT OFFICE

RICHARD W. HANNA, OF PIEDMONT, CALIFORNIA, ASSIGNOR TO STANDARD OIL COMPANY OF CALIFORNIA, OF SAN FRANCISCO, CALIFORNIA, A CORPORATION OF DELAWARE

PROCESS OF TREATING HYDROCARBON OILS WITH METALLIC HALIDES

Application filed November 27, 1926. Serial No. 151,163.

This invention relates to a process of treating hydrocarbon oils with metallic halides, and refers particularly to a process of treating hydrocarbon oils with metallic halides for the production of low boiling point hydrocarbons or naphtha.

In the ordinary batch process of treating hydrocarbon oils with metallic halides, all of the metallic halide which is employed to treat the oil comes into contact with the oil at one time. The metallic halide as it reacts with the hydrocarbon oil forms a sludge or tar which includes the metallic halide and hydrocarbon products, which sludge or tar rapidly decreases the activity of the metallic halide, which finally is thereby rendered substantially inactive to the hydrocarbon oil. Where all of the metallic halide which is to treat a given quantity of oil is introduced into the oil at one time, the formation of such sludge or tar dilutes and covers the entire quantity of metallic halide with the result that the metallic halide is very inefficiently utilized.

I have discovered that the efficiency of the reaction can be materially increased as well as a more efficient use made of the metallic halide if the metallic halide which is employed in treating a given quantity of hydrocarbon oil is applied to said hydrocarbon oil successively or in successive portions with an accompanying removal of each successive portion of the metallic halide or the sludge produced thereby from the oil before the application of the next succeeding portion of the metallic halide to the hydrocarbon oil. By operation of the process in this manner, each portion of the metallic halide applied to the oil may be made to completely react with the oil without the tar or sludge produced from said reaction diluting, covering, or otherwise rendering inactive any portion of metallic halide which has not completely reacted with the hydrocarbon oil. Thereby I am able to treat a given quantity of hydrocarbon oil with less metallic halide and am also able to convert a larger percentage of hydrocarbon oil by means of metallic halide.

The present invention also embodies a method of treating hydrocarbon oil with metallic halide by which metallic halide may be successively applied to the oil in a continuous process within a single reaction chamber. Moreover, the process of the present invention is adapted to reduce the metallic halide sludge to a solid coke with a minimum loss of hydrocarbon oil.

Further features of the present process are the carrying out of the aluminum chloride reaction with the hydrocarbon oil all maintained in the liquid state by the application of suitable pressure, thereby preventing concentration of the materials within the reaction chamber, the continuous supply of heat for the metallic halide reaction in a zone separate and spaced from the reaction chamber, the continuous release of pressure from the admixture on leaving the reaction zone with a continuous separation from the hydrocarbon oil of the produced naphtha, and the continuous recirculation of the incompletely reacted oil back again to the reaction chamber.

The process of the present invention will be more completely understood from a description of the preferred form of the process. For this purpose, the preferred form of the process is hereinafter described as the process is carried out by the apparatus illustrated in the accompanying drawing.

The drawing represents a diagrammatic view, mainly in elevation and partially in vertical section, of an apparatus in which the process of the present invention may be carried out.

In the drawing, 2 indicates generally a reaction chamber which may be set over a furnace 3 whereby the contents of the reaction chamber may be heated, although in the preferred process, the heat is all supplied extraneous of the reaction chamber. The reaction chamber 2 is preferably provided with suitable means for agitating the materials therein, said agitating means being indicated as comprising the agitating blades 4 mounted upon a horizontal shaft 5 which may be driven from without the reaction chamber from the pulley 6. The reaction chamber 2 is also preferably provided with a charger 7 for continuously or intermittently adding metallic halide to the reaction chamber. Said charger 7 is indicated as comprising the charger body 8 connected with valves 9, 10 and 11, the valve 9 closing the charger body from communication with the reaction chamber 2, the valve 10 closing the charger body from communication with the hopper 12, and the valve 11 closing the charger body from a line which may lead to a source of liquid metallic halide when it is desired to supply metallic halide to the reaction chamber 2 in liquid form.

The hydrocarbon oil is supplied to the apparatus from a feed line 13 and placed under pressure by a pump 14 from which it is passed through a heating coil 15 into the reaction chamber 2. The heating coil 15 is indicated as mounted within a furnace 16 having a burner 17 but it is understood that any suitable means for heating the coil 15 may be employed.

18 indicates a discharge line from the reaction chamber 2 which leads from a pressure regulating valve 19 and hence through lines 20 and 21 to one of a plurality of similar stills 22 and 23. The stills 22 and 23 are indicated as mounted over furnaces 24 and 25 heated by suitable means such as burners 26 and 27. The stills are also shown as provided with the draw-off lines 28 and 29.

The stills are also provided with vapor lines 30 and 31 which are preferably connected together and lead to a dephlegmator or reflux tower 32. Said dephlegmator or reflux tower 32 is provided with a vapor line 33 leading to a condenser 34 and hence to a storage tank 35 for gasoline or naphtha produced in the process. Said gasoline or naphtha storage tank 35 is provided with a valved vent line 36 by which a pressure imposed upon the stills 22 and 23 and the vapor refluxing and condensing apparatus may be controlled. The dephlegmator or reflux tower 32 also is provided with a condensate line 37 connected with the line 13 by which the condensate may be recirculated back through pump 14 and heating coil 15 again into reaction chamber 2.

There is also indicated a line 38 for supplying part of the feed oil to the system and passing said feed oil into the dephlegmator or reflux tower 32 in order to control the vapor separation therein while at the same time heating the said feed oil.

The preferred process as conducted in the apparatus described is as follows: As the feed oil to be employed in the system any hydrocarbon oil, such as petroleum oil, shale, or coal tar oil, may be employed. Preferably, however, the feed oil to the system is a petroleum distillate having a gravity between 22 and 30° Beaumé. The oil to be treated is conducted through line 13 where either all or a portion of the feed oil may be diverted to pass first through the dephlegmator or reflux tower 32 and hence the feed oil to the system is passed through pump 14 wherein it is placed under pressure and then forced through heating coil 15 into reaction chamber 2. Within the heating coil 15, the oil is preferably raised to the desired reaction temperature, although in certain cases, heat may be supplied to the reaction chamber 2 for this purpose. The preferred pressure imposed upon the oil and the contents of reaction chamber 2 is from 5 to 50 pounds per square inch gage or higher, the pressure being preferably sufficient to maintain the contents within the reaction chamber 2 in liquid phase and will, therefore, depend upon the ratio of metallic halide to hydrocarbon oil maintained within the reaction chamber 2. In certain cases, pressures considerably higher than 50 pounds per square inch are necessary. The temperature to which the hydrocarbon oil should be raised in the heating coil 15 or reaction chamber 2 is generally between 300 and 650° F. This temperature, however, will depend upon the rate of flow and the products desired and the character of oil employed. In any case, however, the oil is preferably heated in the heating coil 15 to that temperature which will produce the most efficient reaction with the metallic halide.

Within the reaction chamber 2, the hydrocarbon oil within the reaction chamber 2 is contacted with metallic halide which is intermittently or continuously supplied from the charger 7. The metallic halide may be supplied in solid or liquid state. For supplying metallic halide in liquid state, it may, if desired, be admixed with some hydrocarbon oil. The ratio of metallic halide to hydrocarbon oil maintained within the reaction chamber 2 is considerably less than the ratio of metallic halide to hydrocarbon oil necessary to complete the desired reaction. For example, there is preferably maintained within the reaction chamber 2 only about 0.1 to 0.2 pounds of metallic halide per gallon of hydrocarbon oil to be treated where said hydrocarbon oil normally requires approximately 0.8 pounds of metallic halide per gallon of hydrocarbon oil for efficient treatment.

The metallic halide and hydrocarbon oil are continuously agitated together in reaction chamber 2 and therein maintained for a sufficient period of time so that the metallic halide substantially expends its ability to react upon the hydrocarbon oil. The commingled metallic halide and hydrocarbon oil, after exhaustion of the treating power of the metallic halide, together with the produced naphtha from the reaction, are withdrawn as one commingled liquid and passed through line 18 wherein the pressure is reduced in valve 19 either to atmospheric or to a pressure considerably lower than that maintained in reaction chamber 2. From the line 18, the materials are passed to one of the stills 22, 23. The two similar stills are indicated for alternative use so that one may always be running when it is necessary to close the other still down for removal of and cleaned from tar or coke. Within the still, the material is permitted to vaporize either solely due to the residual heat, or assisted by additional heat supplied from suitable means, such as burners 26 or 27. Preferably additional heat is applied to the materials in stills 22 or 23 in order that all of the hydrocarbon material vaporizable may be vaporized therefrom, leaving a residual or coke within the stills. In this way, the most efficient separation of the hydrocarbon oil from the spent aluminum chloride is obtained. The vapors are continuously passed from the stills 22 or 23 into the dephlegmator 32 wherein said vapors are separated to condense therefrom all but the fractions suitable for use as naphtha or motor fuel, these fractions passing through the line 33 and being condensed and passed to storage vessel 35.

The vapor separation is preferably controlled by the regulation of the percentage of the feed oil by-passed from line 13 into said dephlegmator 32. The feed oil, together with the condensed unconverted oils are preferably continuously passed from the dephlegmator 32 through the heating coil 15 and pump 14 wherein said unconverted oils are again raised to the reaction temperature and again raised to the desired pressure and therefrom passed into reaction chamber 2. The majority of the aluminum chloride passed to the still 22 is therein retained with the solid coke. Portions of metallic halide which have not completely reacted may be vaporized and passed to the dephlegmator 32, in which case, they will be recondensed and circulated back through lines 37 and 13 into reaction chamber 2.

Within the reaction chamber 2, the recirculated oil again comes into contact with a further quantity of metallic halide, whereby it is further subjected to treatment so that as a final result of the process, each portion of hydrocarbon oil is successively subjected to contact with successive portions of metallic halide until a complete reaction between the metallic halide and hydrocarbon oil is obtained. At the same time, the carrying out of the process by the successive application of the metallic halide to the hydrocarbon oil with the intermediate separation therefrom of the spent metallic halide prevents the spent metallic halide from interfering with the treating powers of the unspent or freshly added metallic halide.

The process may, if desired, be conducted continuously.

By the process thus described, the hydrocarbon oil is successively brought into contact with fresh undiluted portions of metallic halide until no further reaction can be obtained or until all of said oil has been converted into naphtha and coke.

While the process herein described is well adapted to accomplish the objects of the present invention, it is understood that the process is capable of numerous modifications and the invention is, therefore, not limited to the particular process described but includes all such modifications and changes as come within the scope of the appended claims.

I claim:

1. A process of treating hydrocarbon oils with metallic halide which comprises, heating the hydrocarbon oil to a temperature sufficient to decompose the hydrocarbon oil into lower boiling point oil when contacted with metallic halide and then contacting anhydrous metallic halide and the heated hydrocarbon oil at a temperature suitable for decomposing the hydrocarbon oil into lower boiling point oil and under a pressure sufficient to maintain the same in substantially liquid phase, then passing said admixture into a chamber maintained under substantially reduced pressure, and therein vaporizing the produced lower boiling point oil to separate it from residue retaining substantially all the metallic halide in the spent condition.

2. A process of treating hydrocarbon oil with metallic halide which comprises, heating the hydrocarbon oil to a temperature sufficient to decompose the hydrocarbon oil into lower boiling point oil when contacted with metallic halide and then contacting anhydrous metallic halide and the heated hydrocarbon oil at a temperature suitable for decomposing the hydrocarbon oil into lower boiling point oil and under a pressure sufficient to maintain the same in substantially liquid phase, passing the admixture into a chamber, maintaining said chamber under a substantially reduced pressure, and vaporizing hydrocarbon oil from the coke in which substantially all of the metallic halide is retained in the spent condition.

3. A process of continuously treating hydrocarbon oil with anhydrous metallic halide which comprises, heating the hydrocarbon oil to a temperature sufficient to decompose the hydrocarbon oil into lower boiling point oil when contacted with metallic halide and then continuously contacting metallic halide and the heated hydrocarbon oil together at a temperature sufficient to decompose the hydrocarbon oil into lower boiling point oil and at a pressure sufficient to maintain the admixture substantially in liquid phase, continuously passing the admixture to a chamber maintained under substantially lower pressure, therein continuously vaporizing the hydrocarbon oil to separate it from residue retaining substantially all of the metallic halide in the spent condition, continuously separating from said vapors the higher boiling point oils, and continuously recirculating said oils to said body of metallic halide and hydrocarbon oil undergoing reaction.

4. A process of continuously treating hydrocarbon oil with anhydrous metallic halide which comprises, heating the hydrocarbon oil to a temperature sufficient to decompose the hydrocarbon oil into lower boiling point oil when contacted with metallic halide and then continuously contacting metallic halide and the heated hydrocarbon oil together at a temperature sufficient to decompose the hydrocarbon oil into lower boiling point oil and at a pressure sufficient to maintain the admixture substantially in liquid phase, the ratio of metallic halide to oil being maintained at a ratio less than that sufficient to effect complete conversion, continuously passing the admixture to a chamber maintained under substantially lower pressure, therein continuously vaporizing hydrocarbon oil to separate it from residue retaining substantially all the metallic halide in the spent condition, continuously separating from said vapors the higher boiling point oils, and continuously re-circulating said oils to said body of metallic halide and hydrocarbon oil undergoing reaction.

5. A process of treating hydrocarbon oil with anhydrous metallic halide which comprises, heating the hydrocarbon oil to a temperature sufficient to decompose the hydrocarbon oil into lower boiling point oil when contacted with metallic halide, and then contacting the hydrocarbon oil with metallic halide under a pressure sufficient to maintain the admixture in liquid state until the metallic halide is substantially spent, and thereafter reducing the pressure whereby the produced low boiling point hydrocarbon oils are separated from the spent metallic halide residue under the residual heat of the conversion reaction.

6. A process of treating hydrocarbon oil with anhydrous metallic halide which comprises, heating the hydrocarbon oil in a coil to a temperature sufficient to effect a decomposing reaction on the oil when admixed with metallic halide, continuously contacting the hydrocarbon oil with a portion only of the metallic halide necessary to secure complete reaction in an enlarged reaction chamber and under a pressure sufficient to keep the admixture in liquid phase for a prolonged period of contact, continuously cleansing the hydrocarbon oil from the spent metallic halide by passing the admixture into a flashing zone maintained under the sub-atmospheric pressure, continuously fractionating the unconverted hydrocarbon oils from the produced lower boiling point oils, and subjecting said unconverted hydrocarbon oils to further treatment with metallic halide.

7. A process of treating hydrocarbon oil with anhydrous metallic halide which comprises, heating the hydrocarbon oil in a coil to a temperature sufficient to effect a decomposing reaction on the oil when admixed with metallic halide, continuously contacting the hydrocarbon oil with a portion only of the metallic halide necessary to secure complete reaction in an enlarged reaction chamber and under a pressure sufficient to keep the admixture in liquid phase for a prolonged period of contact, continuously cleansing the hydrocarbon oil from the spent metallic halide by passing the admixture into a flashing zone maintained under the sub-atmospheric pressure, continuously fractionating the unconverted hydrocarbon oils from the produced lower boiling point oils, and subjecting said unconverted hydrocarbon oils to further treatment with metallic halide by recycling said oils in its said body of hydrocarbon oil and metallic halide undergoing reaction and maintained in liquid state.

8. A process of treating hydrocarbon oil with metallic halide which comprises, heating hydrocarbon oil in a flowing stream to a temperature suitable for decomposing the hydrocarbon oil into lower boiling point oil when admixed with metallic halide, then contacting the heated hydrocarbon oil with anhydrous metallic halide under a pressure sufficient to maintain the hydrocarbon oil in substantially liquid phase, then passing said admixture to a chamber maintained under a substantially reduced pressure, and therein vaporizing the produced low boiling point hydrocarbon oil to separate it from residue retaining substantially all the aluminum chloride in the spent condition.

Signed at San Francisco, California, this 16th day of November, 1926.

RICHARD W. HANNA.